(12) United States Patent
Matsumoto

(10) Patent No.: US 9,936,092 B2
(45) Date of Patent: Apr. 3, 2018

(54) ELECTRONIC APPARATUS AND METHOD OF CONTROLLING THE SAME

(75) Inventor: Akihiro Matsumoto, Kawasaki-shi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1117 days.

(21) Appl. No.: 13/480,661

(22) Filed: May 25, 2012

(65) Prior Publication Data

US 2012/0317612 A1 Dec. 13, 2012

(30) Foreign Application Priority Data

Jun. 8, 2011 (JP) .................. 2011-128643

(51) Int. Cl.
| | |
|---|---|
| G06F 17/00 | (2006.01) |
| H04N 1/00 | (2006.01) |
| G06F 21/78 | (2013.01) |
| G06F 21/84 | (2013.01) |
| G06F 21/85 | (2013.01) |
| H04N 1/44 | (2006.01) |

(52) U.S. Cl.
CPC ......... *H04N 1/00891* (2013.01); *G06F 21/78* (2013.01); *G06F 21/84* (2013.01); *G06F 21/85* (2013.01); *H04N 1/00917* (2013.01); *H04N 1/4413* (2013.01); *H04N 1/4486* (2013.01); *G06F 2221/2153* (2013.01); *H04N 1/00204* (2013.01); *H04N 2201/0039* (2013.01); *H04N 2201/0094* (2013.01)

(58) Field of Classification Search
CPC .......... G06F 21/78; G06F 21/85; G06F 21/84; H04N 1/00891

USPC ......................................... 726/1, 16, 28, 36
See application file for complete search history.

(56) References Cited

U.S. PATENT DOCUMENTS

| | | | |
|---|---|---|---|
| 2005/0154935 A1* | 7/2005 | Jin ..................... | G06F 21/31 713/324 |
| 2006/0156028 A1* | 7/2006 | Aoyama ............ | G07C 9/00142 713/186 |
| 2006/0265330 A1 | 11/2006 | Fukasawa | |
| 2007/0192627 A1* | 8/2007 | Oshikiri ............... | G11C 7/24 713/191 |

(Continued)

FOREIGN PATENT DOCUMENTS

| | | |
|---|---|---|
| CN | 1664773 A | 9/2005 |
| CN | 101101553 A | 1/2008 |
| JP | 2004-040155 A | 2/2004 |

OTHER PUBLICATIONS

Office Action issued in corresponding Chinese application No. 201210189577.2 dated Dec. 1, 2014.

*Primary Examiner* — Farid Homayounmehr
*Assistant Examiner* — Suman Debnath
(74) *Attorney, Agent, or Firm* — Carter, DeLuca, Farrell & Schmidt, LLP

(57) ABSTRACT

In an electronic apparatus of this invention, after a security function is canceled, it is determined whether the elapsed time from cancellation of the security function to detection of attachment of a device having a security function of security level higher than that of the canceled security function or the elapsed time until the operation of the attached device is enabled has exceeded a predetermined time. Upon determining that the elapsed time has exceeded the predetermined time, the electronic apparatus enables the canceled security function again.

5 Claims, 6 Drawing Sheets

(56) References Cited

U.S. PATENT DOCUMENTS

| | | | |
|---|---|---|---|
| 2007/0204335 A1 | 8/2007 | Zugenmaier et al. | |
| 2010/0007482 A1* | 1/2010 | Leyden | G08B 13/1472 340/506 |
| 2010/0017595 A1* | 1/2010 | King | H04L 12/2838 713/151 |
| 2010/0174950 A1* | 7/2010 | Park | H04N 21/235 714/48 |
| 2011/0314538 A1* | 12/2011 | Huang | G06F 21/62 726/19 |

* cited by examiner

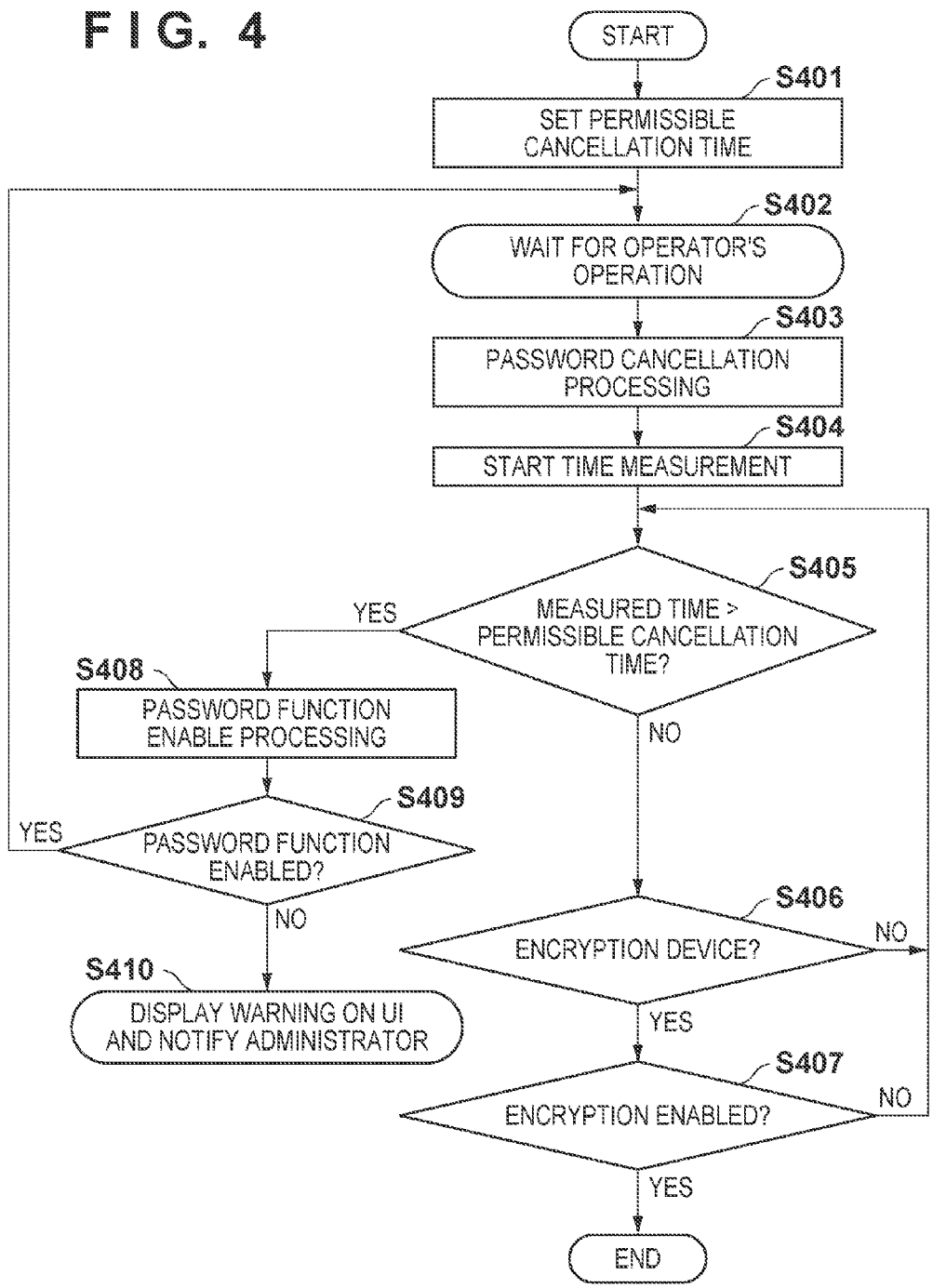

ELECTRONIC APPARATUS AND METHOD OF CONTROLLING THE SAME

BACKGROUND OF THE INVENTION

Field of the Invention

The present invention relates to an electronic apparatus having a security function and a method of controlling the same.

Description of the Related Art

When an apparatus having a second security function of higher security level than a first security function is attached to a printing apparatus which is executing the first security function, interference occurs between the security functions, and therefore, the first security function currently under execution needs to be stopped.

For example, the ATA (Advanced Technology Attachment) standard supported by a hard disk drive defines a security command group. This standard includes a security function using a password as the standard function of a hard disk drive. When the security function (password function) using a password of the hard disk drive is enabled, access to the data area of the hard disk drive is not permitted unless an appropriate password is sent to the hard disk drive. In addition, when powered off and then on in a state in which access to the hard disk drive is permitted, the hard disk drive is activated while enabling the password function again.

Another security function is an encryption method of encrypting data to be written in the hard disk drive. In the above-described password function, data stored in the data area is a plaintext (unencrypted). For this reason, the security may be broken by stealing the password or directly reading the disk in the hard disk drive. On the other hand, adopting the encryption method makes it possible to prevent internal information from being read even if the hard disk drive is stolen. Hence, when the password method and the encryption method are compared, the security level is higher in the latter.

A case will be explained here in which an optional encryption device for encrypting data to be stored in a hard disk drive is attached to a printing apparatus which is executing the password function. As described above, the security level of the encryption method is higher than that of the password function. Hence, executing the password function in the printing apparatus that executes encryption makes no sense and only increases the cumbersomeness in control. Hence, in general, the encryption device itself does not support the security command group of the ATA standard of lower security level.

As described above, when attaching the encryption device of higher security level to the printing apparatus which is executing the password function, interference occurs between the security functions. Hence, to attach the encryption device to the printing apparatus, it is necessary to temporarily power off the printing apparatus. Access to the hard disk drive having the enabled password function is permitted only if a password setting command or a password cancellation command is sent to the hard disk drive at the time of activation from the power-off state. However, the encryption device does not support the security command group, as described above. For this reason, the password function cannot be canceled by sending a command concerning a password to the hard disk drive through the encryption device attached to the printing apparatus. Hence, when attaching the encryption device to the printing apparatus which is executing the password function, it is necessary to first disable the password function of the printing apparatus and then attach the encryption device.

The password function disable processing is manually performed by a user or a serviceman, who operates the operation panel of the printing apparatus at the time of encryption device attachment. In this case, security holes may be generated due to a human error or a fault in the attached encryption device. For example, assume a case in which when attaching encryption devices to a plurality of printing apparatuses, the password function disable processing is performed simultaneously for the plurality of printing apparatuses. In this case, if the encryption devices are attached after the password function disable processing, attachment may be forgotten for some of the printing apparatuses. In addition, the printing apparatus may be left to stand without setting the encryption function in the enabled state due to a fault in the attached encryption device. In either case, the printing apparatus may remain in a security disabled state for a long time.

Under the above-described circumstances, a security management method of an information device configured to connect an internal terminal to an external network has been proposed to eliminate security holes (for example, Japanese Patent Laid-Open No. 2004-40155). In Japanese Patent Laid-Open No. 2004-40155, when doing settings for an information device on a network, the security function of the information device is canceled at a time scheduled in advance. At the expected end time or after the setting, a security management module held in the information device returns the original security function to the enabled state.

However, the method of Japanese Patent Laid-Open No. 2004-40155 provides a technique of returning the temporarily canceled security function to the original enabled state at an expected end time or after setting and cannot be applied to completely disable the original security function. Furthermore, in addition to the expected end time or the end of attachment/setting, the power on/off state and the number of times of power-on/off may be important when attaching an optional device such as an encryption device. However, the method described in Japanese Patent Laid-Open No. 2004-40155 cannot cope with this case.

SUMMARY OF THE INVENTION

The present invention solves the problems of the above-described related art.

The present invention features preventing security hole generation when adding a security function of higher security level to a security function originally provided in an electronic apparatus.

According to one aspect of the present invention, there is provided an electronic apparatus having a first security function, comprising: an instruction unit configured to instruct cancellation of the first security function; a detection unit configured to detect that a device having a second security function of security level higher than that of the first security function is attached to the electronic apparatus; a measurement unit configured to measure an elapsed time after cancellation of the first security function in response to an instruction from the instruction unit; a determination unit configured to determine whether the elapsed time measured by the measurement unit has exceeded a predetermined time before the detection unit detects attachment of the device or before an operation of the attached device is enabled; and an enable processing unit configured to enable the canceled first security function again when the determination unit determines that the elapsed time has exceeded the predetermined time before the detection unit detects attachment of the device or before the operation of the attached device is enabled.

According to another aspect of the present invention, there is provided a method of controlling an electronic apparatus having a first security function, comprising: instructing cancellation of the first security function; detecting that a device having a second security function of security level higher than that of the first security function is attached to the electronic apparatus; measuring an elapsed time after cancellation of the first security function in response to an instruction in the instructing; determining whether the elapsed time measured in the measuring has exceeded a predetermined time before attachment of the device is detected in the detecting or before an operation of the attached device is enabled; and enabling the canceled first security function again when it is determined in the determining that the elapsed time has exceeded the predetermined time before attachment of the device is detected in the detecting or before the operation of the attached device is enabled.

According to the present invention, it is possible to eliminate security holes that can be generated when adding a security function of higher security level to a security function originally provided in an electronic apparatus. This allows a device having a security function of higher security level to be safely and reliably attached to an electronic apparatus which is executing a specific security function.

Further features of the present invention will become apparent from the following description of exemplary embodiments (with reference to the attached drawings).

BRIEF DESCRIPTION OF THE DRAWINGS

FIGS. 3A and 3B are views showing the connection state of the main controller and an HDD in which FIG. 3A shows a state in which the encryption device is not connected, and FIG. 3B shows a state in which the encryption device is connected;

FIG. 4 is a flowchart for explaining processing to be executed by the CPU of the MFP according to the first embodiment of the present invention;

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Note that in the following embodiments, an electronic apparatus of the present invention will be described using a multi-function peripheral (MFP) as an example. However, the electronic apparatus is not limited to the MFP and is also applicable to a printing apparatus, a communication apparatus, an information processing apparatus, and the like.

First Embodiment

Figure 1:
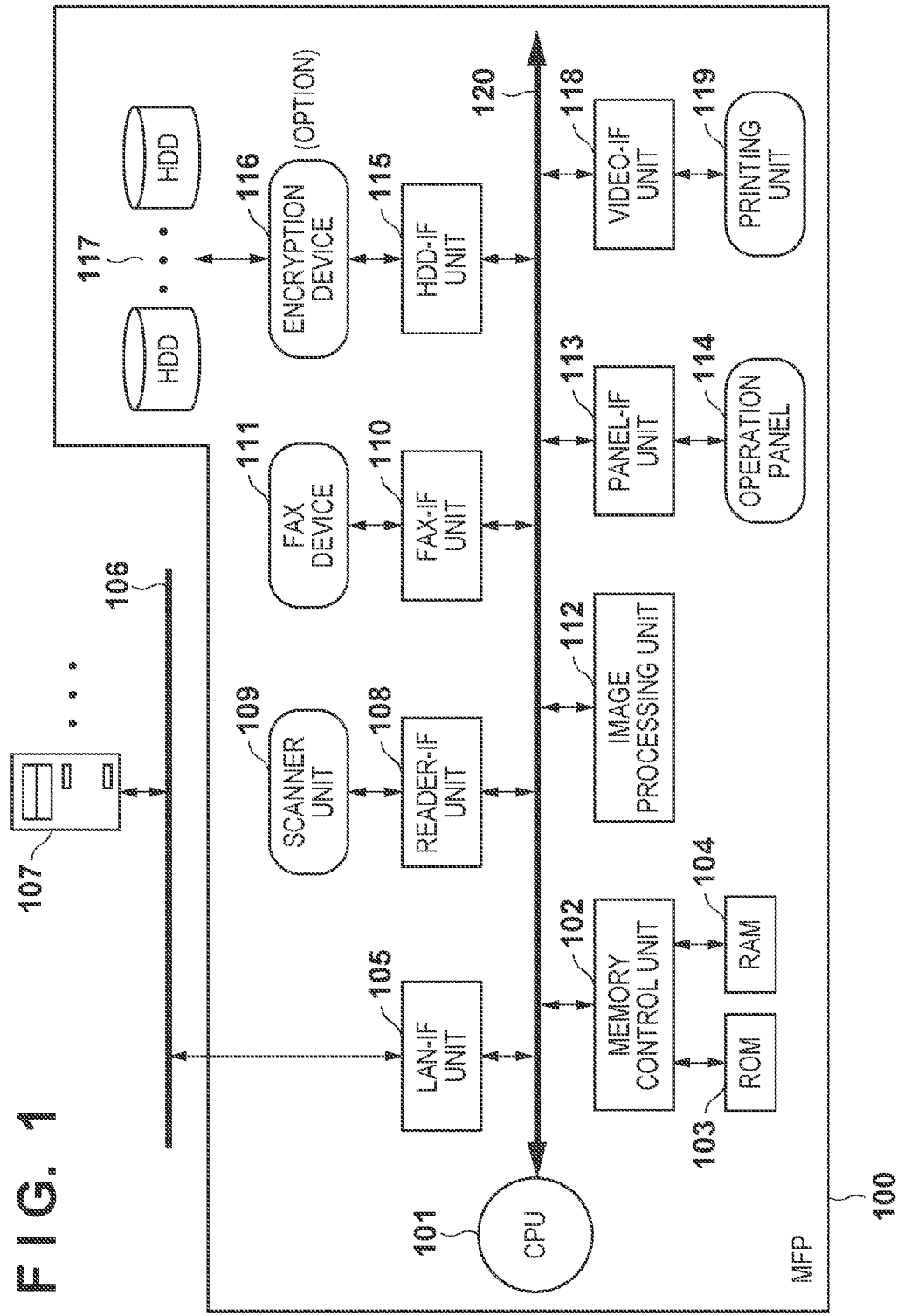
FIG. 1 is a block diagram showing the arrangement of an MFP according to the first embodiment of the present invention while placing emphasis on the arrangement of a main controller.

FIG. 1 is a block diagram showing the arrangement of a multi-function peripheral (MFP) 100 according to the first embodiment of the present invention while placing emphasis on the arrangement of a main controller.

A CPU (Central Processing Unit) 101 performs system control and arithmetic processing. A memory control unit 102 performs input/output control and DMA (Direct Memory Access) control for various kinds of memory devices. A ROM 103 is a read only memory represented by a flash memory and stores a startup program, various kinds of processing and control programs, and control parameters. A RAM 104 is a rewritable memory represented by a DDR (Double-Data-Rate) memory and is used as the work area of a program, a print data storage area, and the like.

A local area network (LAN) interface (LAN-IF) unit 105 functions as an interface to a LAN 106 to which the MFP 100 is connected. The MFP 100 is generally connected to a network-compatible device such as an external host computer 107 via a network cable and prints print data received via the network using the TCP/IP protocol. A reader interface unit 108 performs communication control for a scanner unit 109 and receives image data obtained by scanning of the scanner unit 109, thereby implementing a copy function. A FAX-IF unit 110 performs communication control for a FAX device 111 and sends/receives data to/from the FAX device connected to a telephone line. An image processing unit 112 performs various kinds of image processing for image data received via the LAN-IF unit 105, the reader-IF unit 108, or the FAX-IF unit 110.

A panel-IF unit 113 performs communication control for an operation panel 114. The user can do various kinds of settings and status confirmation of the MFP 100 by operating the liquid crystal display unit and buttons of the operation panel 114 serving as a user interface (UI).

An HDD-IF unit 115 performs communication control for a hard disk drive (HDD) (storage device) 117 complying with the ATA standard. The HDD 117 is a nonvolatile mass storage device which is used to store files or serves as a temporary storage location of print data. In this embodiment, the description will be done using the HDD 117. However, any other device such as an SSD complying with the ATA standard is also usable.

In this example of the system arrangement, an encryption device 116 that is a security option is attached between the HDD-IF unit 115 and the HDD 117. The encryption device 116 performs encryption processing for data to be written in the HDD 117.

A video-IF unit 118 performs command/status communication control and print data transfer for a printing unit 119. Although not illustrated here, the printing unit 119 includes a printer engine and a feed system/discharge system function. The printing unit 119 prints an image on a sheet based on print data mainly in accordance with command information from the video-IF unit 118. A system bus 120 collectively represents the control bus, data bus, and local buses between arbitrary blocks for the sake of convenience.

Figure 2:
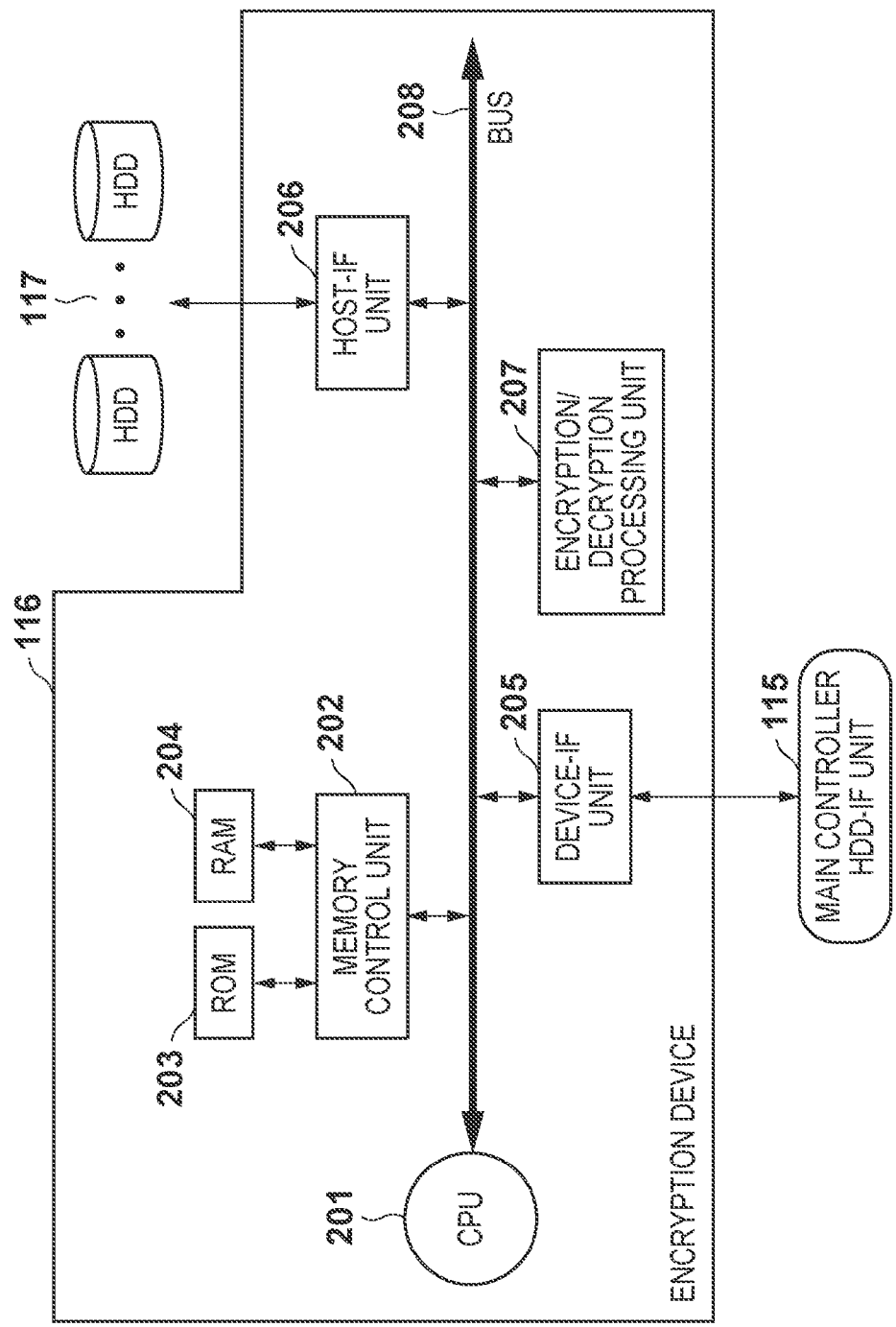
FIG. 2 is a block diagram for explaining an example of the internal arrangement of an encryption device according to the first embodiment of the present invention.

FIG. 2 is a block diagram for explaining an example of the internal arrangement of the encryption device 116 according to this embodiment.

A CPU 201 performs system control, encryption processing, arithmetic processing, ATA standard command processing, and the like. A memory control unit 202 performs input/output control and DMA control for various kinds of memory devices. A ROM 203 stores a startup program, various kinds of processing and control programs, and control parameters. A RAM 204 is used as the work area of a program, a temporary data storage area, a register, and the like. A device interface (device-IF) unit 205 performs command protocol processing complying with the ATA standard on the device side, that is, while regarding the HDD-IF unit 115 of the main controller as the host. A host interface unit 206 performs command protocol processing complying with the ATA standard on the host side, that is, while regarding the HDD 117 as the device. An encryption/decryption processing unit 207 performs encryption processing for data to be written from the main controller to the HDD 117 and decryption processing for data read out from the HDD 117. A system bus 208 collectively represents the control bus, data bus, and local buses between arbitrary blocks for the sake of convenience.

The embodiment will be described below in detail based on the system arrangement example described with reference to FIGS. 1 and 2.

In this embodiment, the encryption device 116 having an encryption function (second security function) of higher level is attached to the MFP 100 which is executing the password function (first security function). At this time, the password function is temporarily canceled in the MFP 100. After determining that the encryption function is enabled, the password function is completely disabled from the function of the MFP 100. That is, enabling the password function is prohibited as long as the encryption function is enabled. In addition, if it is determined under several preset conditions that the encryption function is not enabled, the password function is enabled again. This allows elimination of security holes generated by a human error or the like.

Figure 3A:
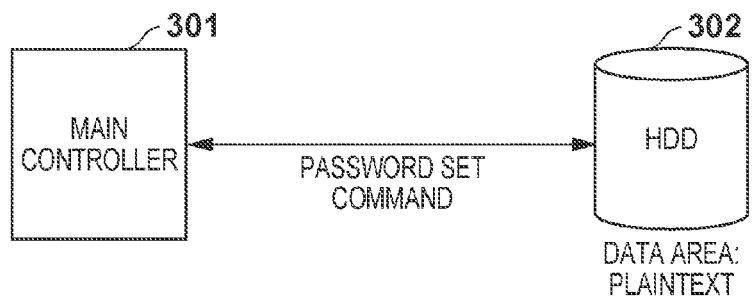

FIG. 3A is a view showing a state in which the encryption device that is a security option is not connected to the MFP 100. In this arrangement, an HDD 302 is directly connected to a main controller 301. When the password function complying with the ATA standard is enabled, a password set command needs to be sent to the HDD 302 to access it. Additionally, when the access is temporarily permitted, and the HDD 302 is then powered off in this state, the password set command needs to be sent again at the next activation time.

Figure 3B:
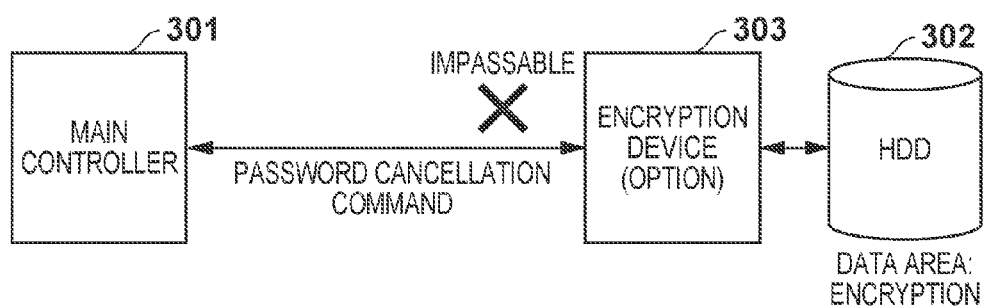

On the other hand, FIG. 3B is a view showing a state in which the password function is enabled, and an encryption device 303 (corresponding to the encryption device 116 in FIG. 1) that is a security option is connected between the main controller 301 and the HDD 302. To attach the encryption device 303, the MFP 100 needs to be temporarily powered off, as a matter of course. As described above, the security level of the encryption function is higher than that of the password function complying with the ATA standard. Hence, in the MFP 100 with the encryption device 303, enabling the password function itself is meaningless. For this reason, the encryption device 303 does not support the ATA standard security command group for enabling the password function in general.

Assume a case in which after the encryption device 303 is attached, as shown in FIG. 3B, a password cancellation command is sent to the HDD 302 to disable the password function. In this case, since the encryption device 303 itself does not support the password cancellation command, the password function cannot be disabled, that is, interference between the security functions occurs.

To solve this interference, the main controller 301 needs to disable the password function for the HDD 302 in the state shown in FIG. 3A before attachment of the encryption device 303. Password function disable processing in FIG. 3A is performed by the operation of an administrator having a specific right or a serviceman via the UI (for example, operation panel) (not shown) of the main controller 301 in a state in which the MFP 100 has transited to a special mode. However, since the password function disable processing is done completely manually, security holes may be generated in the MFP 100 during the process of disable processing.

The embodiment to eliminate the above-described security holes will be described next.

FIG. 4 is a flowchart for explaining processing to be executed by the CPU 101 of the MFP 100 according to the first embodiment. Note that a monitoring program to be used to execute the processing is stored in the ROM 103 and executed under the control of the CPU 101. The password function of the MFP 100 is assumed to be in the enabled state.

This processing starts when, for example, the MFP 100 is powered on. First, in step S401, the CPU 101 obtains a permissible cancellation time during which continuation of the canceled state of the password function is permitted by reading it out from the ROM 103.

Figure 6:
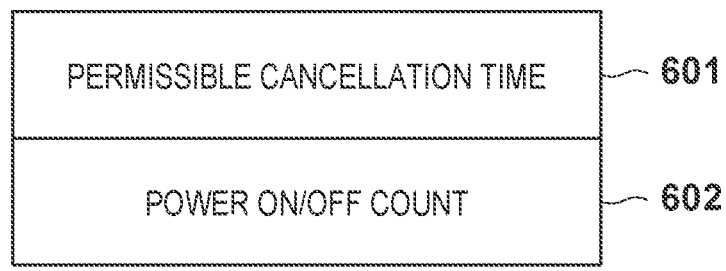
FIG. 6 is a view showing an example of a condition setting register preset in a ROM.

FIG. 6 is a view showing an example of a condition setting register which is preset in the ROM 103 to store a preset condition to be used for determination processing by the CPU 101.

A plurality of preset conditions may be set. In FIG. 6, a permissible cancellation time 601 and an upper limit value 602 of the power on/off count are preset as the conditions to be used for determination. In this embodiment, a case in which the permissible cancellation time (predetermined time) 601 is set will be explained. Another case in which the upper limit value 602 of the power on/off count is also set will be described later in the second embodiment. The permissible cancellation time 601 is set sufficiently considering the time necessary for attaching the encryption device 116, that is, the time from temporarily powering off the MFP 100 and attaching the encryption device 116 to powering on the MFP 100 again. For example, if a time of about 10 min is necessary for the attachment operation on average, the permissible cancellation time is set to about 15 to 20 min.

In step S402, the CPU 101 shifts to a waiting state to wait for the operation of the operator. In this case, the CPU waits for the operator's operation for attaching the encryption device 116 to the MFP 100 in which the password function is enabled. The operator such as a serviceman operates the UI (not shown) of the operation panel 114 to shift the MFP 100 to a special mode to instruct attachment of the encryption device 116 and inputs a password cancellation processing execution instruction. In step S403, the CPU 101 executes password cancellation processing in accordance with the instruction. In step S404, the CPU 101 causes the monitoring program installed in the main controller to start measuring the elapsed time after the password cancellation processing in step S403. Note that this processing can be performed by software or hardware such as a timer.

The time measurement (timing) method can be either absolute time measurement that measures the absolute elapsed time after the password cancellation processing in step S403 or relative time measurement that initializes the time measurement every time the MFP 100 is powered on/off and performs the measurement again. In this embodiment, absolute time measurement is performed. That is, if the MFP 100 is powered off during the measurement, the CPU 101 stores the time measured up to that point of time. At the next power-on time (that is, activation time), the CPU 101 resumes the measurement from the previous stop point.

In step S405, the CPU 101 compares the measured time with the permissible cancellation time 601 at a predetermined time interval. Upon determining by the comparison that the measured time has not exceeded the permissible cancellation time 601, the CPU 101 advances the process to step S406 to confirm the existence of the encryption device 116 that is assumed to be attached to the MFP 100. The CPU 101 can detect the attachment of the encryption device 116 in the following way. For example, the signal line (normally high level) connected to a port on the main controller side and pulled up changes to low level when it is connected to ground on the side of the encryption device 116. Based on the change in the signal line state, the CPU 101 confirms the existence of the encryption device 116. Alternatively, the CPU 101 confirms the existence of the encryption device 116 by performing communication using an extended command that is newly defined for existence confirmation and complies with the ATA standard.

If the existence of the encryption device 116 is not confirmed in step S406, the CPU 101 returns the process to step S405. After that, if the (accumulated) measured time has exceeded the permissible cancellation time during the loop of steps S405 and S406, the CPU 101 advances the process to step S408 to execute password function enable processing again.

The loop of steps S405 and S406 is formed when, for example, the serviceman attaches the encryption devices 116 to a plurality of MFPs on the user's premises. A case is assumed in which after the password function is disabled in all target MFPs, attaching the encryption devices 116 is forgotten for some of the MFPs. In this case, since the encryption devices 116 themselves are not attached yet, timeout occurs (time exceeds). As a result, the password function is enabled again in step S408. After the password function is enabled, the process returns from step S409 to S403, and the CPU 101 shifts to the waiting state again to wait for the operation of the operator.

On the other hand, if the existence of the encryption device 116 is confirmed by the existence confirmation processing in step S406, the CPU 101 advances the process to step S407 to determine whether the encryption function of the encryption device 116 (the operation of the attached encryption device) is enabled. Whether the encryption function is enabled can be determined by, for example, performing communication using an extended command for obtaining a status. If it is determined by the determination processing that the encryption function is enabled, the password function of the MFP 100 is completely disabled. At this point of time, even if the user wants to enable the password function from the UI (operation panel 114) of the MFP 100, the enable button (not shown) displayed on the UI is in the inoperable state (highlighted). Hence, to enable the password function by operating the MFP 100, the user needs to disable the encryption function first.

Upon determining by the determination processing of step S407 that the encryption function is not enabled, the process advances to step S405. During the loop of steps S405 to S407, the CPU 101 determines, based on the result of comparison between the accumulated measured time and the permissible cancellation time, that the measured time has exceeded the permissible cancellation time. In this case, the CPU 101 advances the process to step S408, and executes password function enable processing again.

The loop including step S407 is assumed to be formed when initialization of the encryption device 116 has failed due to a fault in the attached encryption device 116. In this case, since the encryption device 116 does not support the password set command of the ATA standard, as described above, execution of password enable processing itself is impossible in step S408. Hence, in this case, since the password function is not enabled in step S409, the CPU 101 advances the process to step S410 to finally cause the operation panel 114 to display a warning message to notify the operator that the password function is not enabled, and also notify the administrator or the like designated in advance that the password function is not enabled. This allows security holes to be avoided.

As described above, according to the first embodiment, when password function cancellation is instructed, the MFP 100 temporarily executes password function cancellation processing (step S403) to only set the password function to a temporary cancellation level. When the encryption device 116 is attached, and the enabled state of the encryption function is confirmed (step S407), the MFP 100 shifts the password function to a complete cancellation level. Hence, according to this embodiment, the MFP 100 controls the cancellation state of the password function to the two, temporary cancellation level and complete cancellation level, thereby avoiding security holes generated in accordance with cancellation of the password function.

Second Embodiment

Figure 5:
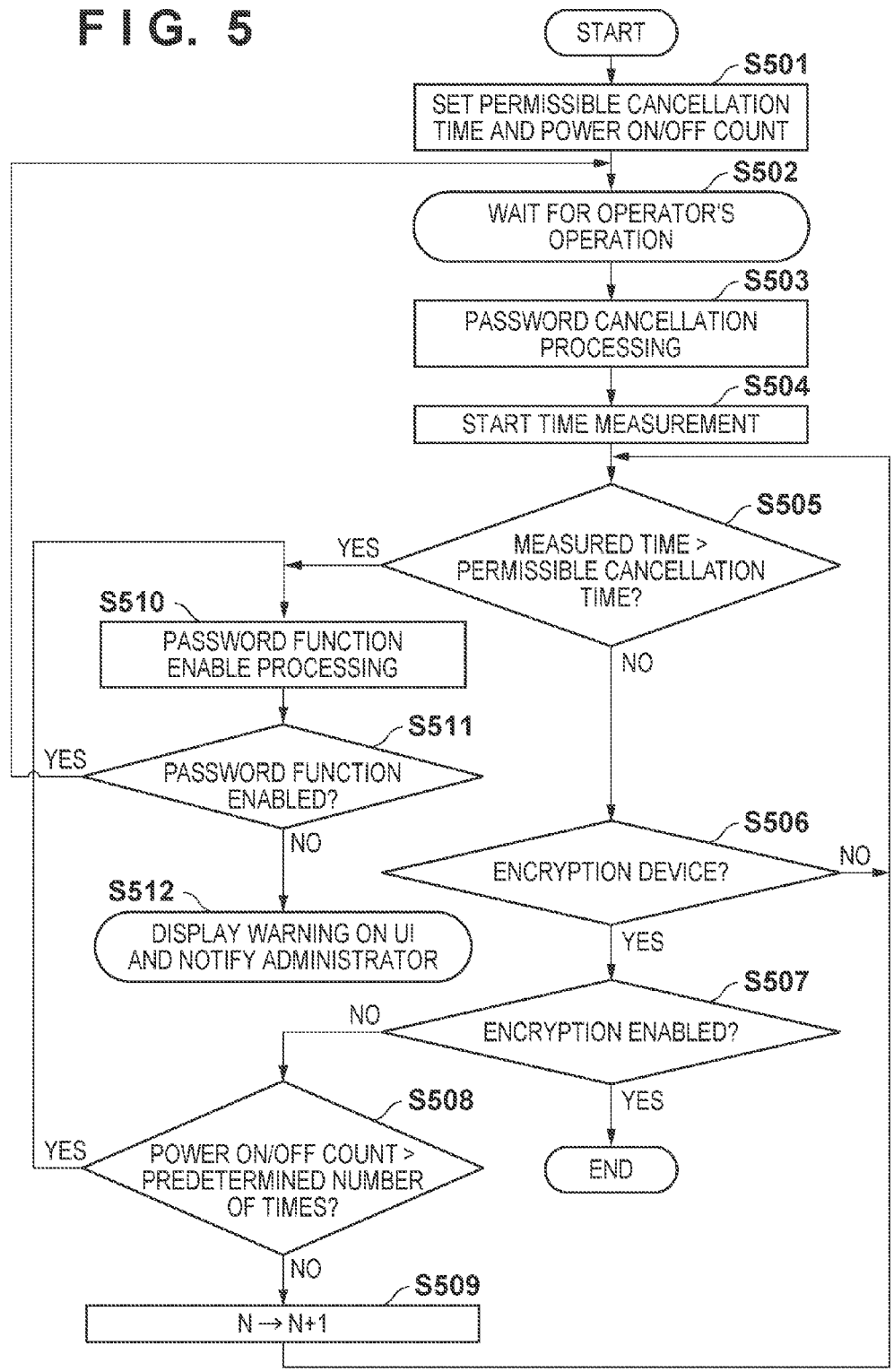
FIG. 5 is a flowchart for explaining processing to be executed by the CPU of an MFP according to the second embodiment of the present invention.

The second embodiment of the present invention will be explained with reference to FIG. 5, in which an upper limit value 602 of the power on/off count is also included in the above-described condition setting register shown in FIG. 6. A ROM 103 of the main controller stores a permissible cancellation time 601 during which continuation of the canceled state of the password function is permitted and the upper limit value 602 of the power on/off count in advance. Steps S502 to S507 and steps S510 to S512 of FIG. 5 are the same as steps S402 to S407 and steps S408 to S410 of FIG. 4 and will briefly be described. The processes of steps S508 and S509 added in this embodiment will mainly be explained.

The power on/off count of an MFP 100 is added as a relation condition to cope with reboot processing in case of initialization failure of an encryption device 116 and thus tighten the security. As described above with reference to FIG. 4, when initialization of the encryption device 116 has failed due to a fault in the encryption device 116, it is impossible to enable the password function of the MFP 100. Hence, finally in step S410, the CPU causes the UI to display a warning message for the operator and also notifies the administrator of it. However, if, for example, the operator leaves his/her seat, the MFP 100 remains unprotected until the administrator takes a measure against the fault. During this time, a malicious person may steal data in an HDD 117, and security holes may be generated in the MFP 100.

In this embodiment, to step up efforts to avoid the security holes, the MFP 100 automatically reboots to attempt reinitialization of the encryption device 116. FIG. 5 is a flowchart obtained by adding steps corresponding to such processing to FIG. 4. Steps S508 and S509 correspond to those steps.

FIG. 5 is a flowchart for explaining processing to be executed by a CPU 101 of an MFP 100 according to this embodiment. Note that a monitoring program to be used to execute the processing is stored in a ROM 103 and executed under the control of the CPU 101. The password function of the MFP 100 is assumed to be in the enabled state.

First, in step S501, the CPU 101 obtains the permissible cancellation time 601 during which continuation of the canceled state of the password function is permitted and the upper limit value 602 of the power on/off count by reading them out from the ROM 103.

In step S502, the CPU 101 waits for the operator's operation for attaching the encryption device 116 to the MFP 100 in which the password function is enabled. In step S503, the CPU 101 executes password cancellation processing in accordance with the operation. In step S504, the CPU 101 starts measuring the elapsed time after the password cancellation processing in step S503.

In step S506, if the encryption device 116 has been attached within the permissible cancellation time 601 but failed in initialization, the encryption function is not enabled in step S507. In this case, the CPU 101 advances the process to step S508 to compare the upper limit value 602 of the power on/off count with the number N of times of reboot, that is, the number N of times of power on/off in the past. If the number N of times has not exceeded the upper limit value 602, the CPU 101 advances the process to step S509 to increment the number N of times by one. The CPU 101 then returns the process to step S505 to attempt reboot processing. Note that the counter for counting the number N of times is provided in a RAM 104. On the other hand, if the number N of times has exceeded the upper limit value (predetermined number of times) 602 in step S508, the CPU 101 advances the process to step S510 to execute password function enable processing in step S510 independently of the elapse of the permissible cancellation time. After the processes of steps S510 and S511, the CPU 101 finally causes an operation panel 114 to display a warning message for the operator and also notifies the administrator of it.

As described above, according to the second embodiment, when password function cancellation is instructed, the MFP 100 temporarily executes password function cancellation processing (step S503) to only set the password function to a temporary cancellation level. When the encryption device 116 is attached, and the enabled state of the encryption function is confirmed (step S507), the MFP 100 shifts the password function to a complete cancellation level. Hence, according to this embodiment, the MFP 100 controls the cancellation state of the password function to the two, temporary cancellation level and complete cancellation level, thereby avoiding security holes generated in accordance with cancellation of the password function, as in the first embodiment.

Additionally, in this embodiment, if the encryption device 116 is attached to the MFP 100, and its encryption function is not enabled, reboot processing is performed to automatically attempt reinitialization of the encryption device 116. When the number of times of reboot processing has exceeded a predetermined value, the MFP 100 automatically returns to a lower security level. This makes it possible to prevent the security function from remaining canceled in the MFP 100 until the administrator takes a measure against a fault when, for example, the operator leaves his/her seat and thus avoid generation of security holes.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-128643, filed Jun. 8, 2011, which is hereby incorporated by reference herein in its entirety.

What is claimed is:

1. An electronic apparatus having a security function, the electronic apparatus comprising:
   one or more processors; and
   at least one memory coupled to the one or more processors, the at least one memory storing instructions which, when executed by the one or more processors, cause the electronic apparatus to:
   instruct cancellation of the security function that provides security protecting the electronic apparatus by authenticating with a password,
   measure an elapsed time after the security function shifts from an enabled state to a canceled state in accordance with the instruction,
   detect connection of an encryption device to the electronic apparatus, wherein the encryption device provides security by encryption which is different from the security provided by the security function,
   determine whether the measured elapsed time has exceeded a predetermined time,
   return the security function from the canceled state to the enabled state again based on the elapsed time being determined to have exceeded the predetermined time while the connection of the encryption device is not detected, and
   maintain the security function in the canceled state regardless of the elapsed time, based on detection of the connection of the encryption device.

2. The electronic apparatus according to claim 1, wherein the at least one memory has further instructions stored thereon which, when executed by the one or more processors, cause the electronic apparatus to obtain a number of times the electronic apparatus has been powered on or off,
   determine whether the number of times has exceeded a predetermined number of times, and
   enable the canceled security function when a determination has been made that the elapsed time has exceeded the predetermined time or the number of times has exceeded the predetermined number of times.

3. The electronic apparatus according to claim 2, wherein the at least one memory has further instructions stored thereon which, when executed by the one or more processors, cause the electronic apparatus to instruct cancellation of the security function when attachment of the encryption device is instructed by a user's operation.

4. The electronic apparatus according to claim 1, wherein the at least one memory has further instructions stored thereon which, when executed by the one or more processors, cause the electronic apparatus to, when the security function cannot be enabled, notify a user that the security function cannot be enabled.

5. A method of controlling an electronic apparatus having a security function, comprising:
- instructing cancellation of the security function that provides security protecting the electronic apparatus by authenticating with a password;
- measuring an elapsed time after the security function shifts from an enabled state to a canceled state in accordance with an instruction in the instructing;
- detecting connection of an encryption device to the electronic apparatus, wherein the encryption device provides security by encryption which is different from the security provided by the security function;
- determining whether the measured elapsed time measured in the measuring has exceeded a predetermined time; and
- returning the security function from the canceled state to the enabled state again based on the elapsed time being determined to have exceeded the predetermined time while the connection of the encryption device is not detected; and
- maintaining the security function in the canceled state regardless of the elapsed time, based on detection of the connection of the encryption device.

* * * * *